United States Patent [19]

Frieling et al.

[11] Patent Number: 5,454,631
[45] Date of Patent: Oct. 3, 1995

[54] POPPET ASSEMBLY FOR A TRACTION CONTROL MODULATOR

[75] Inventors: Rowan Frieling, Cincinnati; Mark A. Zupan, Litchfield; Jerome E. Puterbaugh, Kettering, all of Ohio

[73] Assignee: General Motors Corporation, Detroit, Mich.

[21] Appl. No.: 384,198

[22] Filed: Feb. 6, 1995

Related U.S. Application Data

[63] Continuation of Ser. No. 134,714, Oct. 12, 1993, abandoned.

[51] Int. Cl.6 ........................................... B60T 8/42
[52] U.S. Cl. ........................ 303/115.2; 303/113.2
[58] Field of Search .................... 303/115.2, 115.1, 303/113.2; 251/357, 358, 332, 77

[56] References Cited

U.S. PATENT DOCUMENTS

| | | | |
|---|---|---|---|
| 1,366,501 | 1/1921 | Schweinert et al. | 251/358 |
| 1,935,938 | 11/1933 | Buck | 251/358 |
| 2,295,772 | 9/1942 | Campbell | 251/357 |
| 2,769,454 | 11/1956 | Bletcher et al. | 251/358 X |
| 4,313,594 | 2/1982 | Antoniw et al. | 251/357 |
| 4,531,532 | 7/1985 | Zimmerly | 137/15 |
| 4,571,010 | 2/1986 | Dittner et al. | 303/110 |
| 4,659,059 | 4/1987 | Morris et al. | 251/357 X |
| 4,703,914 | 11/1987 | Hoffmann | 251/332 X |
| 4,938,543 | 7/1990 | Parker et al. | 303/100 |
| 5,013,051 | 5/1991 | Hilaris et al. | 277/89 |
| 5,042,885 | 8/1991 | Villec | 303/110 |
| 5,147,118 | 9/1992 | Reuter et al. | 303/115.2 |
| 5,163,744 | 11/1992 | Tierney et al. | 303/115.2 |
| 5,207,488 | 5/1993 | Newton et al. | 303/115.2 |
| 5,257,856 | 11/1993 | Ota et al. | 303/115.2 |
| 5,263,514 | 11/1993 | Reeves | 251/357 X |

*Primary Examiner*—Robert J. Oberleitner
*Assistant Examiner*—Peter M. Poon
*Attorney, Agent, or Firm*—Anthony Luke Simon

[57] ABSTRACT

A traction control modulator for an automotive traction control system includes a housing having a longitudinal bore in fluid communication with the system. A drive gear selectively rotates a drive screw. A non-rotative nut is threaded onto the drive screw and mounted in the bore. A piston is attached to the nut and slidably mounted in the bore. A retainer is attached to the piston. A spring biases a poppet assembly away from the piston. The poppet assembly is slidably mounted in the bore and includes a poppet, a seal and a seal retainer. The seal retainer has an annular flange received in a groove on a poppet head and an annular cap fitted over a base of the seal.

6 Claims, 3 Drawing Sheets

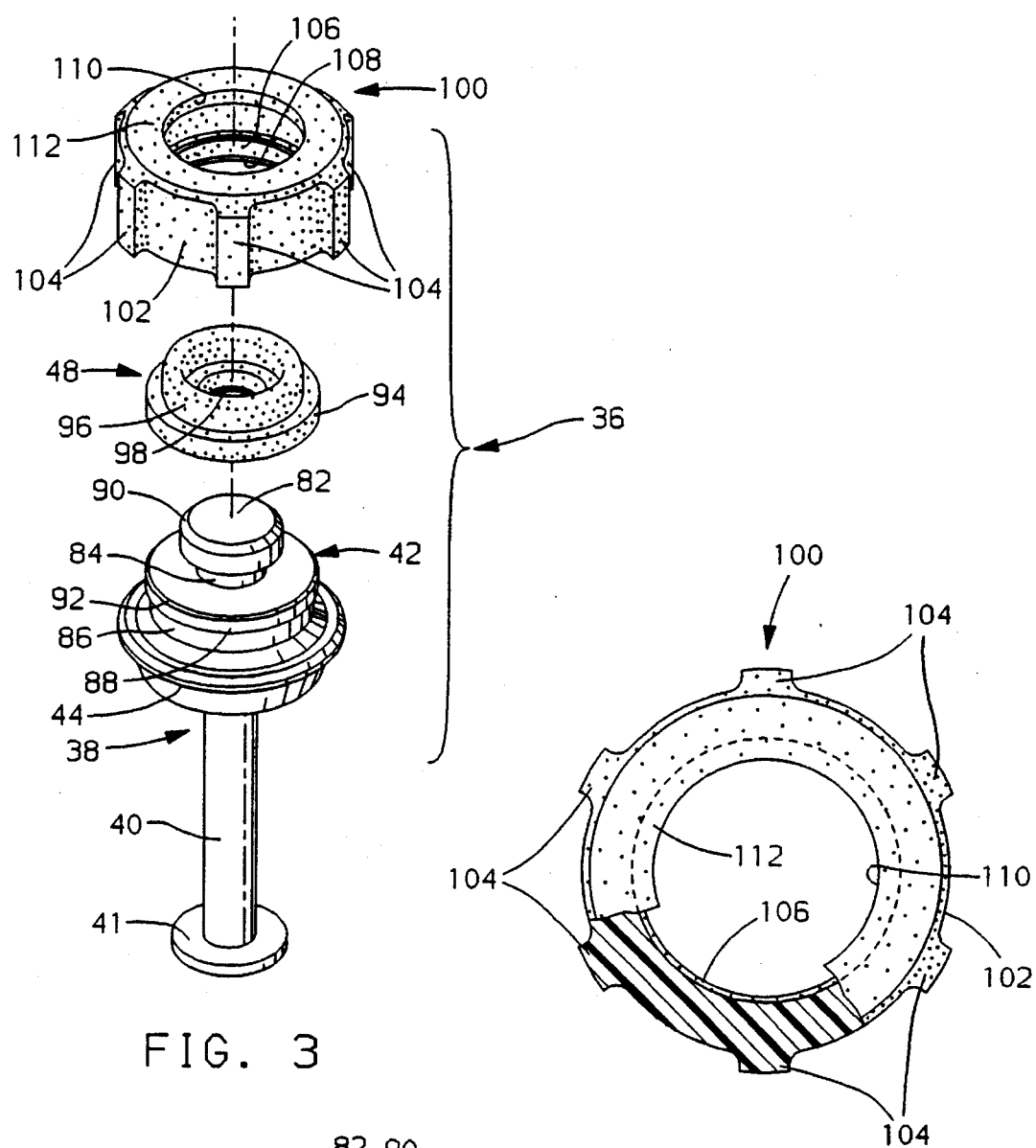
FIG. 3
FIG. 4
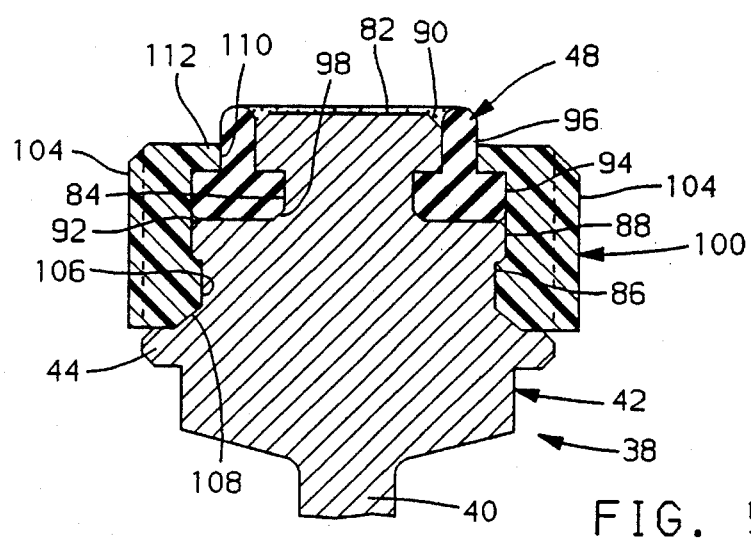
FIG. 5

POPPET ASSEMBLY FOR A TRACTION CONTROL MODULATOR

This is a continuation of application Ser. No. 08/134,714 filed on 12 Oct. 1993 now abandoned.

BACKGROUND OF THE INVENTION

1. Field of the Invention

The present invention relates generally to automotive braking systems, and in particular is concerned with a poppet assembly for a traction control modulator.

2. Description of the Related Art

A traction control system in an automotive braking system permits control of wheel spin at each driven wheel. A traction control system improves the ability to maintain vehicular stability and acceleration (drive-traction) under changing road and vehicle load conditions.

Oftentimes, a traction control system utilizes a type of engine modulation in combination with actuation of a braking system. The present invention is related to the aspect of traction control concerned with automated actuation of the vehicle brakes.

U.S. Pat. No. 5,207,488, assigned to the present assignee, discloses a traction control modulator having a piston attached to a non-rotative nut. The piston is retracted by a power screw threadably engaged with the nut. A poppet assembly or plunger is biased away from the piston by a spring. The plunger includes an elastomeric sealing head which contacts a metal housing to block fluid flow to a master cylinder during operation of the traction control system.

In the event that operation of the traction control system must be terminated, a pressure differential between the master cylinder and a caliper assembly can be created. This condition is known as "pressure lock". The pressure differential can be great enough to pull and tear a sealing head from a plunger, thereby adversely affecting the seal by the sealing head.

SUMMARY OF THE INVENTION

The present invention includes a poppet assembly for use in a traction control modulator. The assembly includes a poppet mounting an elastomeric seal at a first end. A plastic seal retainer is snapped over a portion of the seal and protects the seal during all modulator conditions, including pressure lock.

In a preferred embodiment, a traction control modulator for an automotive traction control system includes a housing having a longitudinal bore in fluid communication with the system. A drive gear selectively rotates a drive screw. A non-rotative nut is threaded onto the drive screw and mounted in the bore. A piston is attached to the nut and slidably mounted in the bore. A retainer is attached to the piston. A spring biases a poppet assembly away from the piston. The poppet assembly is slidably mounted in the bore and includes a poppet, a seal and a seal retainer. The seal retainer has an annular flange received in a groove on a poppet head and an annular cap fitted over a base of the seal.

BRIEF DESCRIPTION OF THE DRAWINGS

FIG. 3 is an enlarged, exploded perspective view of the poppet assembly of the present invention removed from the traction control modulator of FIGS. 1 and 2.

FIG. 4 is an enlarged top view of a seal retainer of the poppet assembly of FIG. 3.

FIG. 5 is an enlarged sectional view of a head of the poppet assembly mounting a seal and the seal retainer.

DETAILED DESCRIPTION OF THE PREFERRED EMBODIMENT

Figure 1:
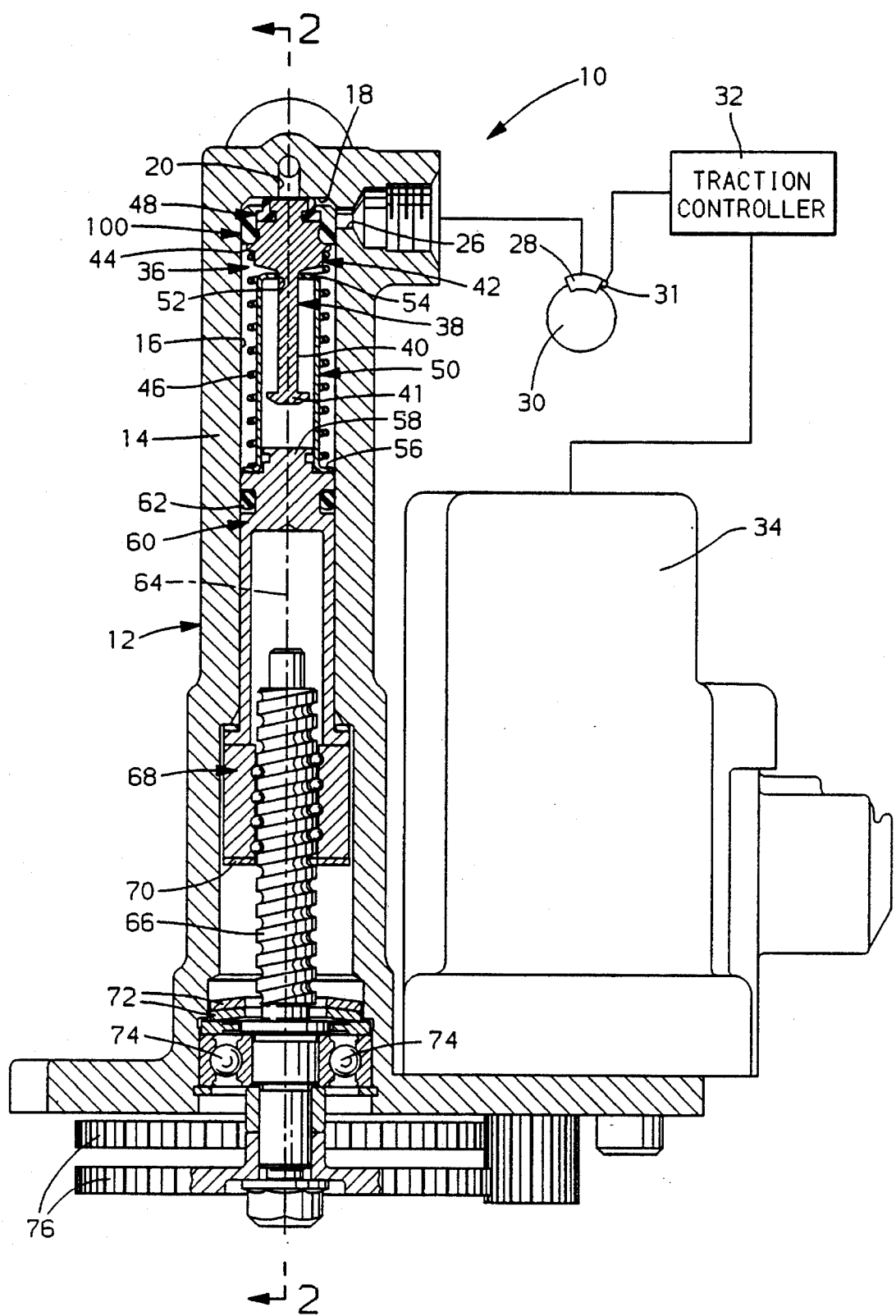
FIG. 1 schematically illustrates a traction control system including a sectional view through a traction control modulator incorporating a poppet assembly according to the present invention.
Figure 2:
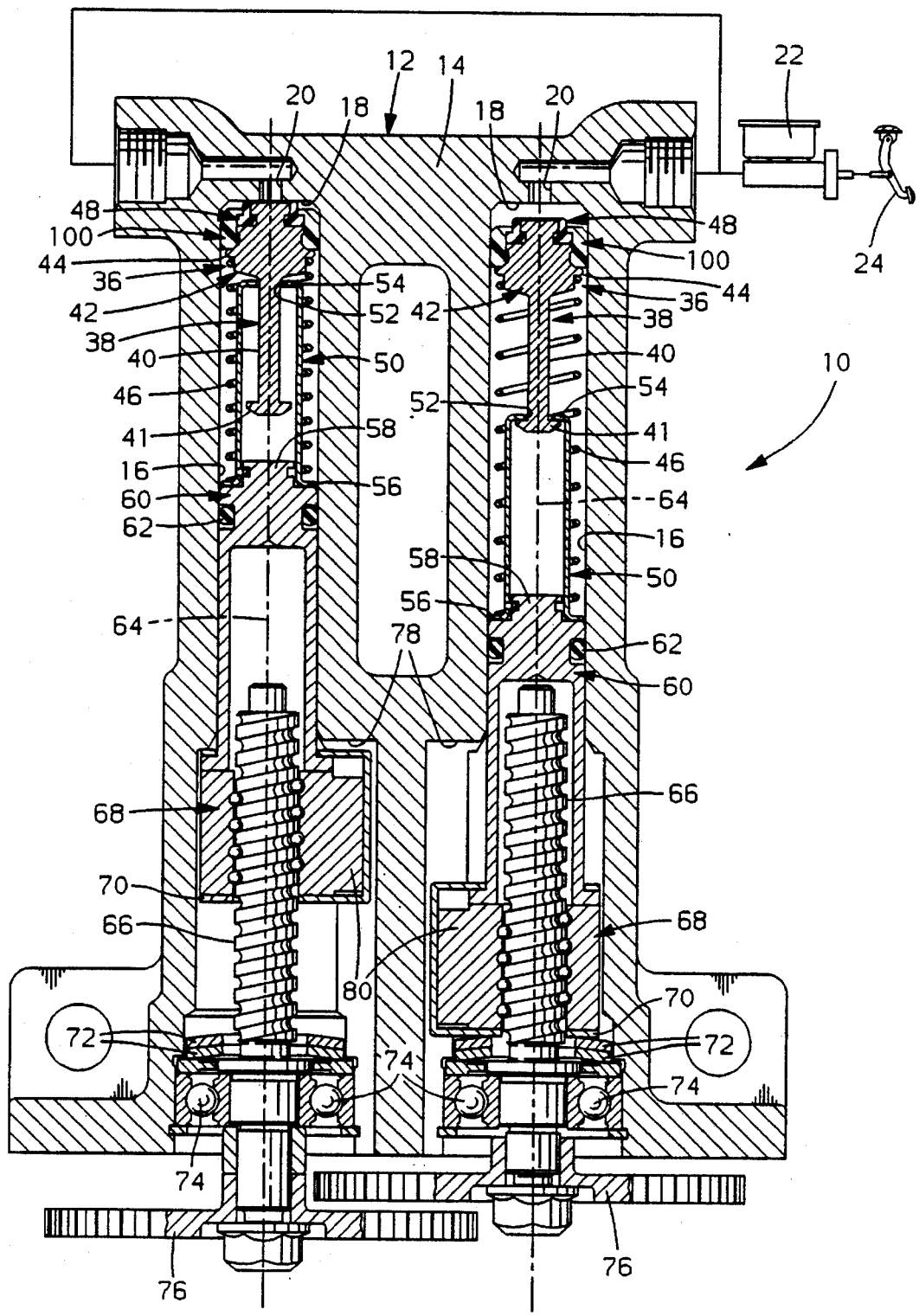
FIG. 2 includes a sectional view of the traction control modulator taken along line 2—2 of FIG. 1.

A traction control system is indicated generally at 10 in FIGS. 1 and 2. The system 10 includes a traction control modulator 12 having a housing 14 with a longitudinal bore 16. Adjacent a top or first end 18 of the longitudinal bore 16 is an intersecting inlet 20 which is in fluid communication with a pressurized fluid-supplying master cylinder 22 (illustrated only in FIG. 2). The master cylinder 22 is actuated by a brake pedal 24 in a well-known manner.

The bore 16 includes an intersecting outlet 26 radially spaced from the inlet 20. The outlet 26 provides fluid communication with a wheel brake 28 (commonly referred to as a wheel brake cylinder). The wheel brake 28 is used to restrain rotation of a wheel 30 in a well-known manner. A sensor 31 detects the rotative condition of the wheel 30 and signals a traction controller 32 which is connected to a reversible electric actuator motor 34.

Slidably mounted within the bore 16 is a poppet assembly 36. The assembly 36 includes a poppet or plunger 38 having a stem 40 terminating at one end in a flange 41 and at the opposite end in a head 42. An annular shoulder 44 about the head 42 provides a mounting surface for one end of a biasing coil spring 46. The spring 46 biases the poppet assembly 36 upwardly towards the inlet 20 so that an elastomer seal 48 mounted on the head 42 is in contact with the top end 18 to block fluid flow through the inlet 20.

An additional aid for mounting the spring 46 is provided by a spring retainer 50. The spring retainer 50 has a series of slots or holes (not shown) to allow easy bleedability to its interior. The retainer 50 also has an opening 52 in a first or upper end 54 receiving the stem 40 of the poppet 38.

The retainer 50 is crimped at a second or lower end 56 to a head section 58 of a piston 60. The lower end 56 also acts as a mounting surface for lower end of the spring 46. The piston 60 is slidably mounted within the bore 16 and sealed by an O-ring 62. Movement of the piston 60 along the axis 64 of the bore 16 is achieved by rotation of a drive screw 66 which is threadably engaged with a non-rotative nut 68. The nut 68 is attached to the piston 60 by a clip 70. A plurality of Belleville washers 72 are provided to cushion the travel of the piston 60 when the system 10 is signaled in a release mode. The drive screw 66 is mounted on the housing 14 by a set of bearings 74 and threadably inserted with the nut 68. The drive screw 66 is torsionally associated with the motor 34 by gears 76. To prevent rotation of the nut 68, a slot 78 in the housing 14 illustrated in FIG. 2 receives an extended portion 80 of the nut 68.

In the non-actuated side of the system 10 as shown in the right hand side of FIG. 2, the nut 68 is in a retracted position causing the retainer 50 to engage the flange 41 and positively pull back the poppet assembly 36. The seal 48 is withdrawn from the top end 18 of the bore 16 so that fluid may freely flow from the master cylinder 22 to the wheel brake 28 as desired by a driver.

Upon detection of the appropriate rotative condition by the sensor 31, the controller 32 signals the motor 34 to rotate the drive screw 66 to move the nut 68 in an actuated or extended position, thereby causing the piston 60 to move upwardly within the bore 16, as illustrated in the left hand side of FIG. 2 and in FIG. 1. Upon the upward movement of the piston 60, the seal 48 will mate with the top end 18 via the force exerted by the spring 46. Additional details of the traction control system 10 and modulator 12 can be found in U.S. Pat. No. 5,207,488, issued May 4, 1993 and hereby incorporated by reference.

The poppet assembly 36, illustrated in detail in FIG. 3, is designed to operate at all system conditions, including substantial hydraulic pressure differentials which can adversely affect sealing in prior traction control systems. As stated above, the poppet 38 includes a stem 40 connecting a flange 41 with a head 42. The flange 41 is of sufficient diameter to contact the top end 54 of the retainer 50 to pull the poppet assembly 36 away from the top end 18 of the bore 16. The head 42 includes a tip portion 82 having an annular groove 84. A second annular groove 86 is provided in the head 42 between groove 84 and shoulder 44. An annular retaining wall 88 is formed between groove 86 and groove 84. A first chamfer 90 is provided on the tip portion 82, and a second chamfer 92 is provided on the retaining wall 88. Preferably, the poppet 38 is a unitary member formed from a material such as aluminum.

The seal 48 is formed from a suitable material such as rubber. The seal 48 has an annular base 94 and an upwardly projecting ring portion 96. A chamfer 98 is provided on an inner surface of the base 94. The seal 48 is slipped over the tip portion 82 so that the base 94 is seated in groove 84. Chamfers 98 and 90 facilitate the snap-on fit of the seal 48. The height of the ring portion 96 is such that the ring portion 96 extends a predetermined distance beyond the tip portion 82 when the seal 48 is mounted on the head 42.

A seal retainer 100 is formed preferably from a suitable plastic and snapped over the seal 48 to prevent the seal 48 from being pulled from the head 42. The seal retainer 100 includes an annular wall 102 having a plurality of guides 104 formed on its outer circumference, illustrated best in FIG. 4. The guides 104 are preferably equally spaced about the circumference and parallel with the axis 64 of the bore 16. The guides 104 direct the poppet assembly 36 along the inner surface of the bore 16. Fluid flow is permitted between adjacent guides 104. An annular, radially inwardly projecting flange 106 having a chamfer 108 is formed in the wall 102. An opening 110 in an upper end of the seal retainer 100 forms an annular, radially inwardly extending cap 112. The seal retainer 100 is slipped over the head 42 so that flange 106 is seated in groove 86. Chamfers 108 and 92 facilitate the snap-on fit of the seal retainer 100.

When the seal retainer is assembled on the head 42, the cap 112 covers the base 94 of the seal 48. Two levels of retenting the seal 48 are provided by the assembly 36. First, the base 94 is retained in the groove 84. Second, the cap 112 fits over and covers the base 94. In this manner, the seal 48 is prevented from separating from the head 42, even when fluid differential forces in the system 10 tend to pull the seal 48 upwardly away from the tip portion 82. Furthermore, the poppet assembly 36 is an economical snap-together assembly which can easily be adapted for other applications.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. A traction control modulator for an automotive traction control system, the modulator comprising:
    (a) a housing having a longitudinal bore in fluid communication with the system;
    (b) a drive screw rotatably mounted in the bore;
    (c) means for selectively rotating the drive screw;
    (d) a non-rotative nut threaded onto the drive screw;
    (e) a piston attached to the nut and slidably mounted in the bore;
    (f) spring means biasing a poppet assembly away from the piston; and
    (h) wherein the popped assembly is slidably mounted in the bore and includes
        (i) a poppet having a stem terminating at one end in a flange and at a second end in a head the head having first and second annular grooves;
        (ii) a seal having a base received in the first groove of the head and a ring portion extending axially beyond the head; and
        (iii) a seal retainer having an annular flange received in the second groove of the head and an annular cap fitted over the base of the seal.

2. The modulator specified in claim 1 wherein the seal retainer has an annular wall having a plurality of guides formed on the circumference of the wall for directing the poppet assembly along the inner surface of the bore.

3. The modulator specified in claim 1 wherein the seal retainer is formed from plastic.

4. A poppet assembly for an automotive traction control modulator, comprising:
    (a) a poppet having a stem terminating at one end in a flange and at a second end in a head;
    (b) a tip portion on the head opposite the stem;
    (c) a first annular groove formed in the head of the poppet between the tip portion and the head;
    (d) a second annular groove formed in the head of the poppet between the first groove and the stem;
    (e) a seal having a base received in the first groove of the head and a ring portion extending axially beyond the entire head;
    (f) a seal retainer having an annular wall, an annular inner flange formed on the wall and received in the second groove of the head, and an annular cap formed at one end fitted over the base of the seal.

5. The poppet assembly specified in claim 4 wherein the annular wall of the seal retainer includes a plurality of guides on its outer surface for directing the poppet assembly along an inner surface of a bore.

6. The poppet assembly specified in claim 4 wherein the seal retainer is formed from plastic.

* * * * *